UNITED STATES PATENT OFFICE.

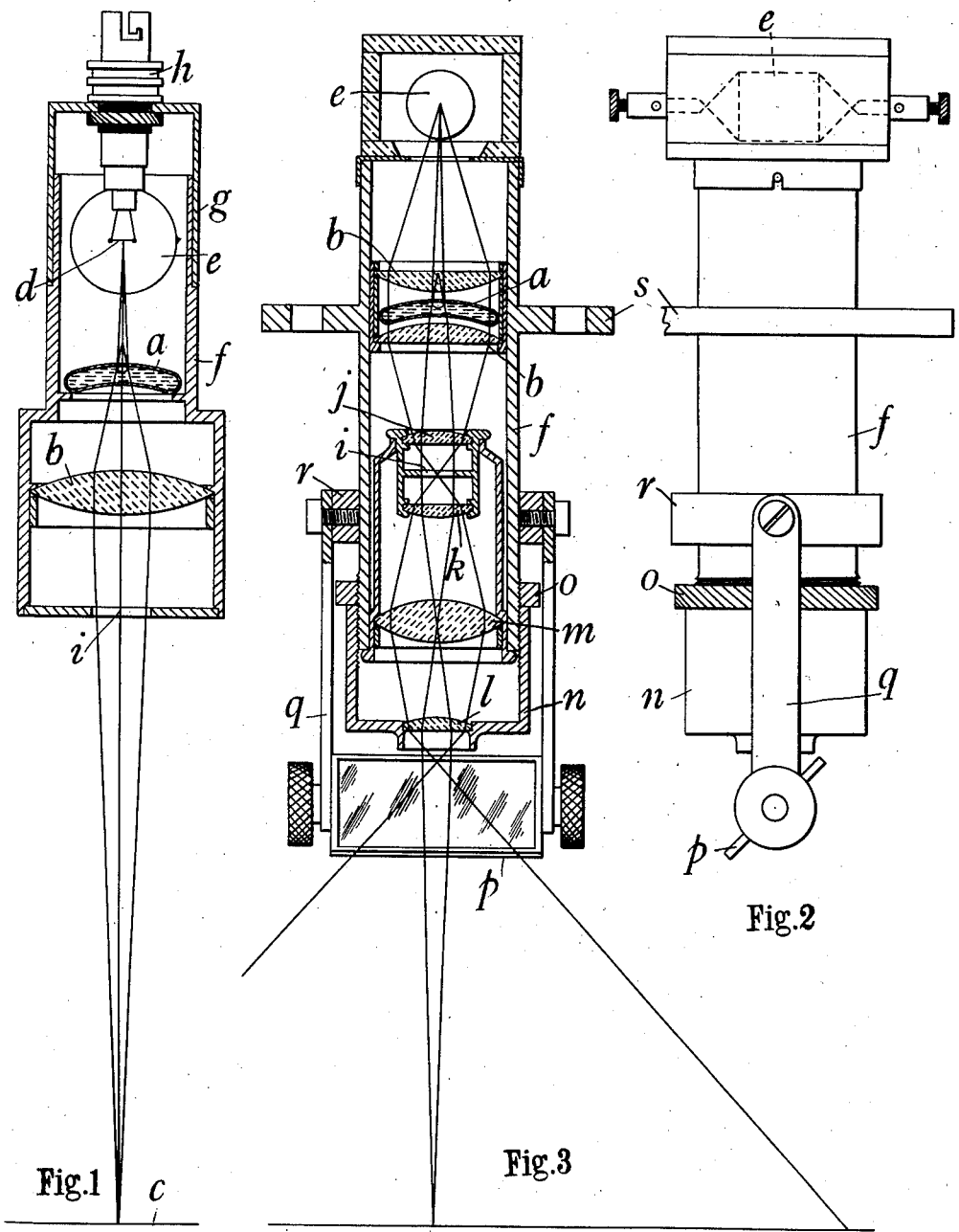

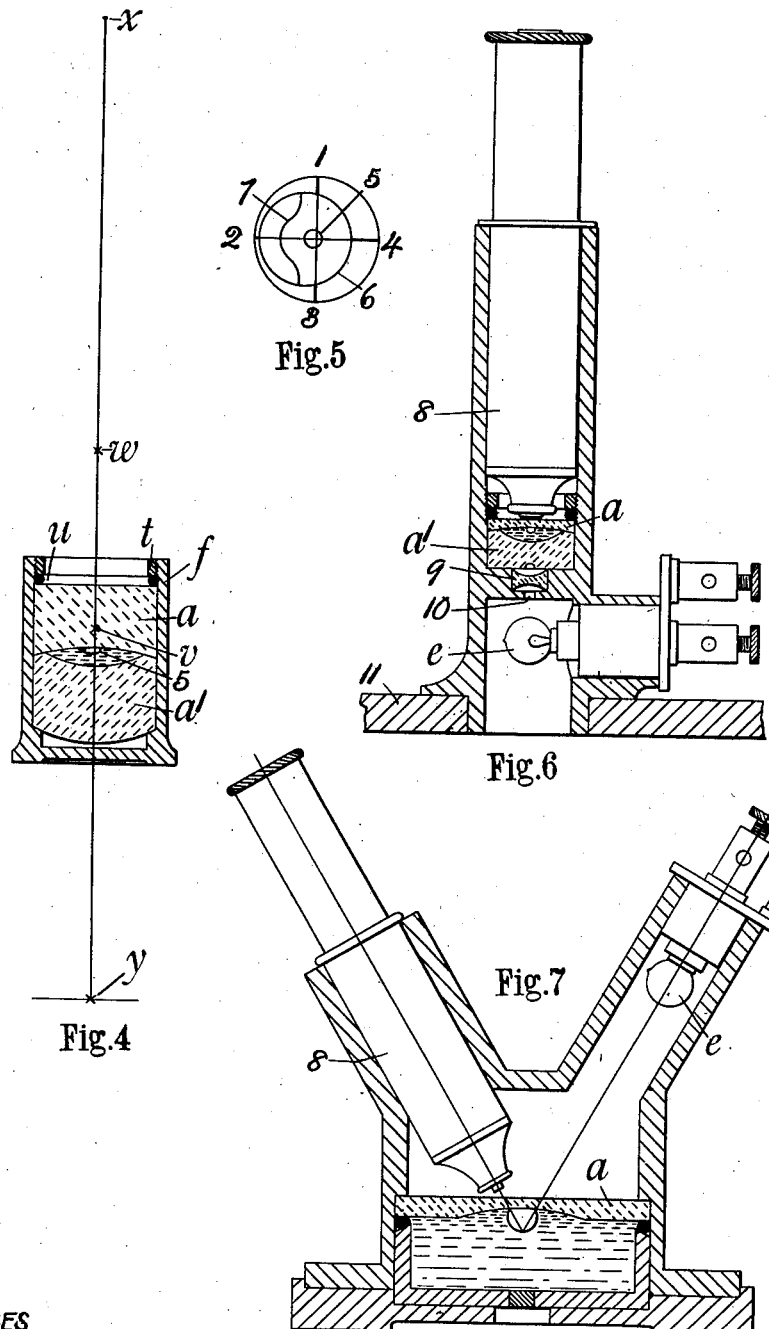

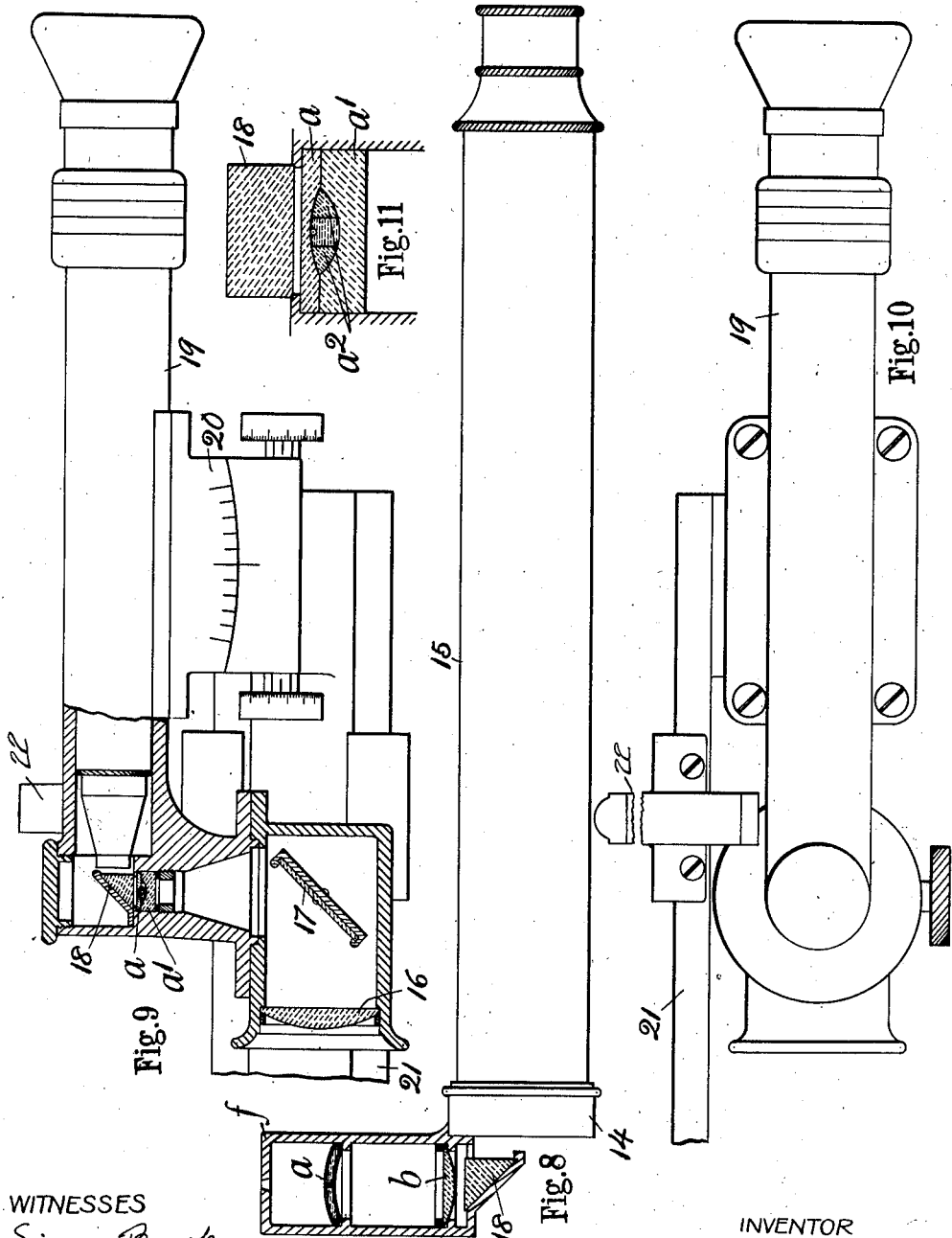

ARTHUR CYRIL WEBB ALDIS, OF BIRMINGHAM, ENGLAND.

LEVEL AND THE LIKE.

1,063,761.  Specification of Letters Patent.  Patented June 3, 1913.

Application filed June 7, 1911. Serial No. 631,714.

*To all whom it may concern:*

Be it known that I, ARTHUR CYRIL WEBB ALDIS, subject of the King of Great Britain, residing at Old Grange Road, Sparkhill, Birmingham, England, manufacturing optician, have invented certain new and useful Improvements Relating to Levels and the Like, of which the following is a specification.

This invention has for its object to provide improved levels and like instruments depending for their operation upon the movements of a fluid bubble.

The invention comprises the employment of the fluid bubble in an optical system to act as a lens, that is, the surface of the bubble forms one of the refractive or reflective surfaces in an optical system, and the arrangement of such system so that the movements of an image due to displacement of the bubble can be viewed directly or by projection on a screen.

In the three accompanying sheets of explanatory drawings: Figure 1 is a vertical section of an optical level constructed in accordance with this invention. Figs. 2 and 3 are side elevation and vertical section respectively of another form of optical level specially adapted for use in submarine vessels. Fig. 4 is a vertical section and Fig. 5 a diagrammatic plan of an optical level adapted for engineers and surveyors, while Fig. 6 is a vertical section of an elaborated form of such level adapted for use, more especially in the setting of astronomical instruments. Fig. 7 is a vertical section showing an adaptation of the invention to serve as a vibrascope. Fig. 8 illustrates the combination of a level with a telescope. Figs. 9 and 10 are part sectional elevation and plan showing the application of the invention to clinometers for gun laying and like purposes, and Fig. 11 is a section to a larger scale of the level alone.

The same reference letters in the different views indicate the same or similar parts.

In the application of the invention to a simple form of optical level as shown in Fig. 1 adapted for projection of an image on a screen, I employ a small closed cylindrical tube $a$ containing transparent liquid similar to an ordinary level but preferably with a smaller and approximately spherical bubble. This is mounted in conjunction with a simple condenser lens $b$ the latter being placed at such a distance from the level as to focus on a screen $c$ the image of the incandescent filament $d$ of a lamp $e$ formed by the bubble. This combination of lamp and condenser is mounted in a vertical brass tube $f$ the top part of which $g$ contains the lamp holder $h$ and slides on the part $f$ in the form of a cap so as to facilitate the changing of lamps. The screen $c$ is arranged in fixed relation to the tube or projector $f$ in any convenient manner.

The image transmitted through the bubble and the condenser $b$ will show an end elevation of the filament as viewed from a point on the axis vertically below the lamp. In order that a convenient and clear index mark might be obtained the filament should be in the form either of a single straight line or else a sharp V perpendicular to the axis of the instrument. Also the tip of the electric bulb should be situated at the side to avoid distortion of the image of the filament.

When a tubular level as $a$ is employed it is supported at its two ends so that the curved axis of the level lies in a diametral plane which in the drawing is the plane of the paper. The condenser $b$ is made of sufficiently large aperture to include complete pencils transmitted from the lamp through the bubble even when the latter is displaced to the limit of its motion. The bubble forms an air lens of strong negative power and consequently gives a virtual image of the filament immediately above the level for all displaced positions. The lens $b$ must therefore be designed so that the conjugate of this virtual image lies approximately on the screen $c$.

A stop $i$ is located below the lens $b$ at any suitable position. By thus providing a restricted aperture for the passage of the pencils the resultant image is rendered free from spherical aberration and consequently gives a well defined index mark. Since the tube of liquid $a$ forms part of the optical system transmitting the image it is evident that the resultant image will suffer severely from astigmatism, but since a straight line index mark perpendicular to the plane of the paper only is required the condenser $b$ can be adjusted so as to focus this focal line on the screen and no loss of sharpness or brilliancy will be detected.

Figs. 2 and 3 illustrate a tubular optical level designed especially for submarine vessels, and the more complex arrangement there represented is adapted to combine the following features: (a) The image moves in the same direction as the bubble. (b) The image forms a vertical line having a horizontal motion along a narrow vertical screen placed level with the observer's eye. (c) No lens elements need be of larger aperture than the total length of the level a itself. (d) The image can be focused and also centered in the case where the screen is rigidly fixed and marked with a scale and zero position. (e) The lens system employed for reversing the motion of the image embodies the principle of the well known erecting eye piece, and consequently affords a flat field so that the index mark is clearly and sharply defined in its extreme positions as well as in the central position. Since in a submarine it is the level of the whole vessel that has to be indicated it is evident that the rigid connection between the instrument and the screen is provided by the vessel within which they are fitted, and hence the motion of the bubble can be very largely magnified and a greatly amplified motion shown on a screen of large dimensions.

Referring to Figs. 2 and 3, e is a tubular electric lamp or "roof-lamp" which preferably presents a straight line of incandescent filament. The lamp is mounted in a small detachable box at the top of the projector tube f in a manner which permits of ready replacement of burned out lamps. Two plano-convex condensers b are placed with their convex sides immediately adjacent to the tubular level a which is mounted in a short metal cylinder which acts as a distance piece between the said lenses. The mounting for the lenses b and level a is arranged so as to insure the axis of the level being fixed in a plane perpendicular or at right angles to the line of the filament in the lamp e. In conjunction with the lenses b are coaxially mounted three small equal plano-convex lenses j, k, l, and one larger double convex lens m which latter is optically equivalent to the two condenser lenses b placed with their plane sides together. The adjustments are such that the center of the lens m and the upper condenser lens b are equi-conjugates for the compound lens made up of the two lenses j and k which are situated approximately equi-distant from the level a and the lens m and are placed symmetrically with plano sides adjacent. Thus since the bubble forms a virtual image of the filament immediately above the level a, the conjugate of this virtual image formed by the two lenses j and k will always lie in the central plane of the lens m which is approximately at the focus of either lens k and l the latter being also placed symmetrically with regard to the lens m with convex sides adjacent.

The filament of the lamp e is placed at the focus of the upper condenser lens b so that the axes of all pencils emanating from e and transmitted through the lenses b, j, k, and m form an approximately symmetrical pattern about the plane of the stop at the point i which is situated midway between the two lenses j and k. As regards the lens l this is mounted in a focusing cell n which screws on the lower end of the projector tube f in the form of a cap and is provided with a lock ring o to fix it when the image has been focused on the screen. By means of a mirror p (or a totally reflecting prism) pivoted by links q on the projector tube the image is deflected to a vertical screen (not shown) the movement of the image on the screen being then in a horizontal direction. The connection of the links q with the tube f is effected by a ring r which can be rotated slightly with respect to the tube. By this means the image can be readily set to the zero position or to any graduation on the screen. A flange s enables the instrument to be securely bolted to a horizontal bracket which is preferably rigidly fixed to the roof of the vessel.

A simple spherical optical level designed for direct visual observation of the image of a pair of cross lines and adapted for the purposes of engineers and surveyors is shown in Fig. 4. Two thick lenses a and a' are worked so that they form an optical contact around the portions of their surfaces in contact. The lens a' has a central cavity ground thereon for the reception of the liquid. By the use of optically ground surfaces between the abutting portions of the lenses the liquid is effectively sealed and leakage prevented. The upper surface of a is plane and has marked on it two fine lines intersecting at right angles on the axis of the instrument, while the lower surface of a' is polished and silvered, forming when viewed from above a shallow concave mirror. The two lenses a and a' are tightly clamped together in a metal holder f by means of a clamp t with a continuous coil spring u interposed between it and the upper plane surface of the lens a. By means of the coil spring an even pressure is insured all around the edge of the lens and the necessary provision made for inequalities of expansion and contraction of the glass and brass elements.

The optical arrangement of the level shown in Fig. 4 is such that the concave surface of the upper lens a lies just below the focus v of the bottom mirror, while the upper surface of that lens is situated considerably above it. Consequently the image of the cross lines on a seen in the bottom mirror through the parts of the liquid lens not obstructed by the bubble lies at a point w some distance above the upper surface of a, and this image affords a ready means for centering the eye (situated at *x*) accurately on the axis of the instrument and so obviating errors in estimating centrality due to parallax. The eye having taken up its proper position, the bubble is adjusted so that the images of both cross lines seen through it are coincident with the original cross lines on the upper surface of *a*. Now since the image of the cross lines due to the bubble itself lies just above the bubble this image lies even nearer to the focus *v* of the bottom mirror than the bubble itself, and is in fact only just below it. Hence the reflected image of the cross lines seen within the enlarged reflected image of the bubble is situated at *y* a long way below the level, and their movement, due to displacements of the bubble, is greatly magnified. For rapidly and roughly leveling the instrument it is sufficient to move the small bubble until it appears central. For greater accuracy the very much enlarged image of the bubble as seen by reflection in the bottom of the level can be used, while for the greatest accuracy the eye is centered by means of the cross lines and their reflected image viewed through the liquid, and then the image of the cross lines seen through the bubble by reflection at the mirror is brought into exact coincidence with their intersection.

Fig. 4 shows the bubble slightly displaced and Fig. 5 shows what is seen when the eye is centered above such a level with the bubble slightly displaced in the direction of one of the cross lines. The circle 1, 2, 3, 4, represents the outer edge of the top lens *a*, and the lines 1, 3, 2, 4, are the two cross lines traced on it. 5 is the bubble which is slightly displaced along 4, 2. The eccentric circle 6 represents the enlarged reflected image of the bubble and the thicker radial lines between it and the outer circle represent enlarged images of the portions of the lines 1, 3, and 2, 4, seen in the reflector outside the bubble. The coincidence of such thick portions of the lines with thin intersecting portions indicates that the observer's eye is centered. The curved line 7 is the image of that portion of the line 1, 3, which is seen through the bubble and indicates that the bubble is not central. As the bubble is brought to its central position this line rapidly straightens out until it coincides with the line 1, 3. The strong curvature of the lines as viewed through the bubble in all but the central position forms a very accurate means of detecting an error of level.

Fig. 6 shows an optical level for obtaining the highest sensitiveness while affording that quick motion which can always be obtained with levels of small size employing comparatively strong curvatures. The level is more especially adapted for the setting of astronomical apparatus. The viewing instrument is an ordinary compound microscope 8 with its objective placed immediately above a small spherical level *a a'* designed similarly to that shown in Fig. 4 as regards the method of sealing the alcohol in a double convex cavity. In this case, however, the top glass *a* is thin, both the cavity and the bubble are very small and the bubble travels on a very shallow concave surface at the underside of the lens *a*. The lower glass *a'* has its under surface perfectly opaque except for a small hemispherical cavity polished in its center. Immediately below this central cavity there is mounted a small double concave negative lens 9, and below this is situated a small central stop 10 and a detachable electric lamp *e*. The whole of the optical arrangement is rigidly mounted at right angles to a suitable base plate 11. The lens 9, the small cavity in the base of *a'* together with the powerful diverging effect of the small bubble all tend to result in a very small image of the illuminated stop 10 being seen in the eye piece, and produce, what is sometimes known as an artificial star. When the image of this stop due to the bubble is adjusted so as to be in the focal plane of the compound microscope very small displacements of the image will be rendered abundantly evident by the compound microscope, and they may be read off on a micrometer contained in the eye piece of the instrument. So sensitive can such a level be made that it can readily be adapted to act as a vibrascope. To render it efficient for that purpose, however, the following modifications should be introduced. The spherical level itself should be made larger and the curvature of the surface over which the bubble moves much steeper in order to avoid the trouble of carefully leveling the instrument for bringing the spot of light into the field of view of the microscope. The bubble should be as large as the microscope will admit. By such means the level is rendered comparatively insensitive considered only as a level, but the bubble will be very sensitive to vibration owing to the inertia of the large mass of surrounding liquid, and such vibrations are made very apparent by the microscope viewing the image of the illuminated stop 10. Such an instrument can obviously be standardized in all its parts and therefore a set of vibrascopes made all of which will show the same amplitude of motion in the eye piece when subject to identical tremors. It is very difficult, however, to provide a large level with a large bubble and at the same time get the object glass of a high power compound microscope sufficiently close for viewing the image produced by refraction through the bubble. To obviate this difficulty I have devised a special form of vibrascope as shown in Fig. 7.

In this case the image of a small incandescent filament in a lamp is viewed by reflection in the cavity of a comparatively large bubble in the level a. A spherical level with a known type of sealed metallic reservoir will be quite suitable, but the curvature of the surface over which the bubble travels should be large in order to avoid the trouble of having to adjust the bubble very carefully to the central position.

The image of the filament produced by reflection in the bubble is situated above the level and can therefore readily be viewed even by a very high power microscope as represented by 8. As the deflections of the reflected rays due to tremors of the bubble are very much more marked than the deflections of the refracted rays, the instrument shown in Fig. 7 is exceedingly sensitive to tremors. It possesses the limitation, however, that it only affords readings of tremors in the plane of the reflection since the image by reflection suffers very greatly from astigmatism, and it is necessary therefore to focus on a focal line and take readings of the amplitude of its motion in a direction perpendicular to its length. The instrument can, however, be turned around until the maximum amplitude is obtained when the reading can be taken. Vibrascopes designed on the lines of Fig. 6 indicate at once the amount and direction of the maximum oscillation. The vibrascope shown in Fig. 7 can also obviously be standardized, and thus the readings of different instruments used for comparative tests.

A useful form of optical level adapted as an attachment for a telescope is shown in Fig. 8. It consists of a short vertical tube $f$ mounted on a ring or collar 14 which latter is adapted for attachment to the objective end of a telescope 15 so that when the axis of the telescope is horizontal the axis of the short tube $f$ is vertical. At its upper end the tube $f$ is closed except for a small central stop or aperture as shown. Below the stop or aperture about half way down the tube $f$ is placed a small tube or transparent spherical level $a$, and below this again is arranged a positive lens $b$ so placed that the image of the aperture due to the bubble is at the focus of the lens $b$. The latter will therefore form an image of the aperture as seen through the bubble at infinity, and this can be viewed by the telescope 15 simultaneously with any other distant external objects, the said image being directed by means of the total reflecting prism 18 placed opposite the upper portion of the telescope objective. It should be noted that the attachment is of small size in comparison with the telescope, and consequently the small prism diminishes only slightly the brilliancy of the image of external objects as seen by the eye. Superimposed on this image there would be a sharp image of the stop or aperture which image would move over a wide visual angle for comparatively slight displacements of the telescope axis. If, therefore, the telescope is fitted with cross wires the telescope could be quickly and accurately leveled by causing the spot image of the aperture to come centrally on the cross wires.

Such a device as that above described is evidently of great use as a clinometer for gun sights, enabling the one telescope to act both as sight for aiming at a target and also as clinometer for aiming at an invisible target by means of sight elevation. The device is especially advantageous in naval gunnery since in these operations it is imperative to have a level which will immediately respond to and accurately indicate the changes in inclination which are continually occurring in a moving vessel. For the precision required, however, in modern gun sighting it is necessary to obtain the utmost refinements in order to secure apparatus sufficiently accurate and sensitive.

Figs. 9, 10 and 11 show apparatus designed to give the aforesaid accuracy and to afford an artificial horizon visible in the instrument quite independently of the ordinary telescopic sight, and moreover mounted in a convenient manner for the purpose of gun laying under the ordinary conditions of naval practice. The level employed is a spherical level designed for a high degree of accuracy and sensitiveness. Though essentially a spherical level the cavity containing the bubble is purposely made longer in one direction than at right angles to it so as to afford a very small degree of free motion of the bubble in a lateral direction and a more extended motion in a longitudinal direction. The level is formed by clamping together two flat glass plates $a$ $a'$ worked to an optical contact at the adjacent plane surfaces, the upper one having a small spherical cavity ground and polished in it and exactly opposite this there is a corresponding spherical cavity of very much stronger curvature ground and polished in the lower plate. The deep cavity in the lower plate is, however, partially filled up with cement as indicated by $a^2$ in order to form a long cavity or channel within which the very small bubble can travel. In the instrument shown the bubble has about four degrees total travel in the longitudinal direction, and only one or two degrees of motion at right angles to this. Cross wires are placed vertically below the level and brightly illuminated either by an electric lamp with frosted bulb or by means of a lens 16 in conjunction with a mirror 17 placed at an angle of forty-five degrees. The lens and mirror focus on the cross wires the light coming from the opening toward which the telescopic sight is directed. Immediately above the level is mounted a total reflecting prism 18 which enables the image of the cross wires due to the bubble to be focused by a microscope 19. The whole is rigidly mounted on an arc clinometer 20. The latter enables the angle of sight to be very accurately set, the adjustment being such that the axis of the microscope should indicate the true horizontal position when the telescopic finder is laid on the target.

The fixed base of the clinometer is attached to a long bar 21 which slides on a supporting bracket 22. The bar is accurately mounted so that it always lies exactly parallel with the axis of the telescopic sight. The microscope is set either absolutely parallel with this direction or at a small elevation according to the desired angle of sight by means of the arc clinometer 20. Both the telescopic sight and the bar carrying the optical level may be arranged to slide in their supports so that either can be conveniently drawn forward or pushed backward according to which the gun-layer decides to use. The microscope transmits to the observer's eye a greatly magnified image of the cross wires formed by the bubble and the minute displacements of the bubble give rise to very large displacements as seen in the field of view of the microscope. The eye piece is provided with fixed cross wires. In actual practice, after the sight has been set according to the instructions received from the range finders, the gun-layer adjusts his gun so that the moving image of the cross wires seen in the microscope coincides with the fixed cross wires in the eye piece. The gun is then correctly laid in the required position for firing.

The invention is not limited to the purposes or modes of application herein described as it may also be applied for various other uses provided that in all cases the bubble serves as a lens in the associated optical system.

Having thus described my invention what I claim as new and desire to secure by Letters Patent is:—

1. In levels and the like, an optical system consisting in part of a bubble arranged to act as a lens and means whereby movements of an image due to displacement of the bubble can be viewed, substantially as described.

2. In levels and the like, the combination comprising a bubble arranged to act as a lens and means whereby movements of an image due to displacement of the bubble can be viewed, substantially as described.

3. In levels and the like, the combination comprising a pair of lenses formed with an intermediate cavity containing fluid and a bubble, and means whereby movements of an image due to displacement of the bubble can be viewed, substantially as described.

4. In levels and the like, the combination of an optical system consisting in part of a bubble arranged to act as a lens; means for directing light through the bubble, and means whereby movements of an image due to displacements of the bubble can be viewed, substantially as described.

5. In levels and the like, the combination of an optical system consisting in part of a bubble arranged to act as a lens; a lamp situated on one side of the bubble, a condenser on the other side of the bubble, and a screen for receiving an image produced by the bubble, substantially as described.

6. In levels and the like, the combination of an optical system consisting in part of a bubble arranged to act as a lens; condenser lenses mounted on opposite sides of the bubble, a lamp on one side of the bubble, a reversing lens system, a condenser and focusing lens situated on the opposite side of the bubble, and a screen, substantially as described.

In testimony whereof I have signed my name to this specification in the presence of two subscribing witnesses.

ARTHUR CYRIL WEBB ALDIS.

Witnesses:
JOHN MORGAN,
FRANCIS MALPAS.